United States Patent [19]
Kimura

[11] 3,952,765
[45] Apr. 27, 1976

[54] DEVICE FOR SEPARATING AIR BUBBLES OF FLUIDS IN PIPING, AND SILENCING WATER FLOW

[76] Inventor: Shinichi Kimura, 5-34, 5 jo, Misono, Toyohira, Sapporo, Hokkaido, Japan

[22] Filed: Dec. 4, 1974

[21] Appl. No.: 529,459

[52] U.S. Cl. .................................. 137/171; 137/207
[51] Int. Cl.² ........................................ B01D 19/00
[58] Field of Search .......... 137/207, 568, 202, 197, 137/199, 593, 171; 55/36, 156

[56] References Cited
UNITED STATES PATENTS

| 407,830 | 7/1889 | Loretz | 137/207 X |
| 1,721,944 | 7/1929 | Cole | 137/593 X |
| 2,710,664 | 6/1955 | Blackmore | 137/199 X |
| 3,790,306 | 2/1974 | Uefiji | 137/202 |
| 3,854,906 | 12/1974 | Roffelsen | 55/159 |

Primary Examiner—Alan Cohan
Attorney, Agent, or Firm—Tab T. Thein

[57] ABSTRACT

A device for separating air bubbles from fluids, e. g. feed water, to provide smoother flow thereof, and to protect the piping against corrosion. The device comprises a large hollow cylinder intercalated in the piping and an air-cushion member at the top of the cylinder. An air exhaust pipe is provided in the member to separate the air bubbles.

6 Claims, 4 Drawing Figures

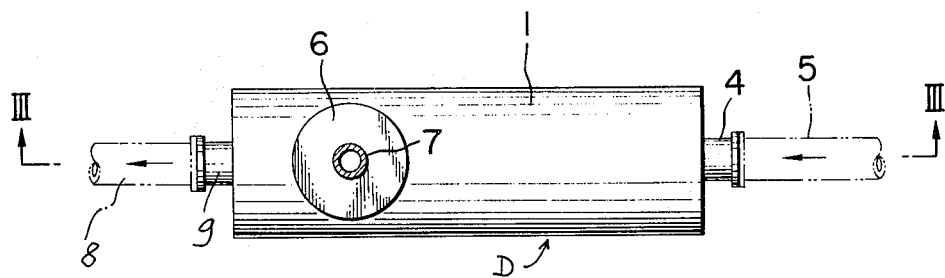
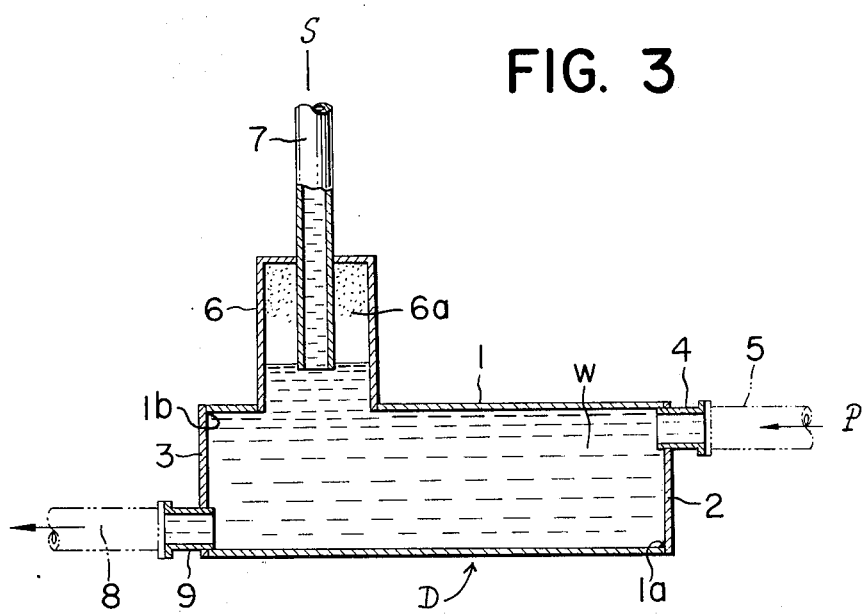

DEVICE FOR SEPARATING AIR BUBBLES OF FLUIDS IN PIPING, AND SILENCING WATER FLOW

The present invention relates to a device for separating air bubbles generated in a piping through which water is forced to flow, and for silencing the water flow.

In a conventional hot-water heating system (or a cold-water cooling system) installed in a building, a sound wave of the water supplying pump, generated in the water supply pipe, is usually transmitted through the hot water, causing a disturbing noise in the building, and an interruption of the water supply due to the air bubbles produced in the pipes. This is the so-called air-lock phenomenon that is likely to happen, thereby deteriorating or interrupting the heating (or cooling) function. Thus such systems require manual work to make the generated air bubbles escape, e.g. collectively in some part of the piping.

An object of the present invention is to provide a device for smoothing the water supply in such piping, as well as for preventing a sound wave being transmitted through the piping.

It is another object of the invention to prevent the oxidation or corrosion of the inner surfaces of the piping, by separating and removing the air bubbles from the water.

The present invention is characterized basically by comprising in the device a large hollow cylinder, an air-cushion member protruding on the top of the cylinder at a portion near the front or outlet end thereof, and an exhaust pipe with its lower end fixed to the top of the air-cushion member and extending thereinto, for the formation of an air cushion therein.

Other objects of the present invention, novel features and advantages thereof will be understood from the description of a preferred exemplary embodiment thereof, to be given hereinafter with reference to the accompanying drawings. The description is given, as a matter of example, for a hot-water heating system.

In the drawings,

FIG. 2 is an enlarged cross-sectional view taken generally on the line II — II of FIG. 1;

FIG. 3 is a cross-sectional view taken generally on the line III — III of FIG. 2.

Figure 1:
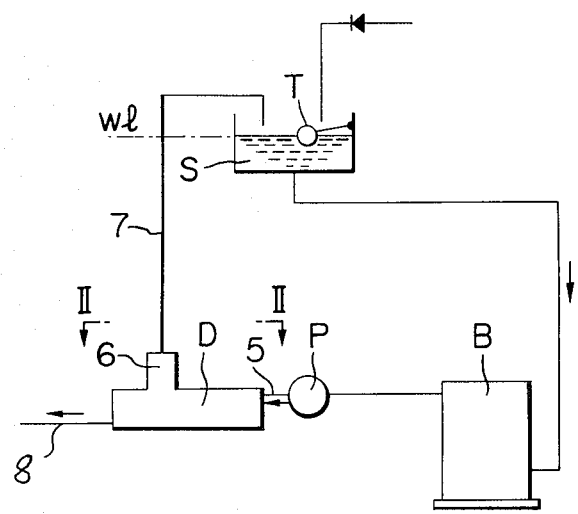
FIG. 1 is a schematic, general illustration of an exemplary device according to the present invention, shown as part of a piping installation.

As shown in FIG. 1, a cistern or tank S of a piping installation is supplied with water W via an influx pipe schematically shown and (having an inward arrow sign thereat), and the supplied water volume is controlled with a ball-type valve or tap T. The water in the cistern S is supplied to a boiler B via another pipe. After the water is heated up in the boiler B, the hot water is circulated by a pump P. In this hot-water circulating system, originating from the pump, a device D according to the present invention is inserted. It is desirable to install the device of the invention as close as possible to the pump.

Now the construction of the device D is to be described with reference to FIGS. 2 and 3. A large hollow cylinder 1 has rear and front walls 2, 3, preferably welded to the two sides. At the upper part of the rear wall, a fitting 4 is mounted. To a flange of the latter, an inlet pipe 5 from the circulating pump P is connected.

Generally, the diameter of the cylinder 1 is decided depending on the volume, flow speed, turbulence, etc. of the water flowing through the pipe 5. According to experiments, the diameter of the cylinder 1 is preferably 2 to 5.5 times larger than that of the fitting 4 (or the pipe 5).

A diameter smaller than 1.5 times the fitting 4 is insufficient for eliminating air bubbles in the supplied water, while an excessive diameter, like that of the storage tank, for example a diameter exceeding that of the fitting pipe 6 times, is too large for solving the turbulence and separating the air bubbles.

A diameter of the cylinder 1 which is 1.5 times smaller than that of the fitting 4 is not enough for eliminating the air bubbles of the supplied water thereinto, since the two diameters become substantially the same.

From the viewpoint to increasing the elimination effect of the air bubbles in the fluid, it is necessary to solve turbulence within the large cylinder 1 by producing therein a resistance. However, when the diameter of the cylinder 1 is more than 6 times that of the fitting 4, the resistance becomes so small that the elimination effect of the turbulence of the flowing water does not increase.

Neither case can attain the object of the present invention. From the viewpoint to increasing the elimination effect and to decreasing the manufacturing costs, it is most desirable to set the axial length of the cylinder 1 approximately 4 to 9 times longer than its diameter.

There are welded portions $1a$, $1b$ at the two ends of the cylinder 1. It is recommended not to make these portions $1a$, $1b$ and the front and rear walls 2, 3 in arcuate shapes, but make them perpendicular or angular as shown in FIG. 3. If the welded portions $1a$, $1b$ are made arcuate, the flow of the water W through the tube 5 produces a swirl along the arcs of the welded portions, and the sound wave S will still exist. In this case, the object of the invention cannot be achieved.

At a part of the upper surface of the cylinder 1, a sleeve-like air-cushion member 6 of a diameter substantially equal to that of the cylinder 1 is protrudingly provided, allowing an air cushion $6a$ to form therein above the water level as shown in FIG. 3. Preferably, the member 6 is so positioned that the axis thereof is at a position within 1/10 to 4/10 of the whole length of the cylinder 1 from the front or outlet end of the latter, to obtain a good separation of the air bubbles in the water. The height of the air-cushion member 6 is to be at least the same as the diameter of the cylinder 1 or longer. This is for obtaining a full effect of the air cushion, as will be described later.

At the center of the top plate of the air-cushion sleeve 6, an exhaust pipe 7 is provided, downwardly projecting into the air-cushion member. The lower end of the exhaust pipe 7 protrudes into the member by ½ to 4/5 of the height of the latter, and is fixed at this level. Because of this arrangement, air is allowed to stagnate around the lower end of the exhaust pipe 7 to form the air cushion 6.

Accordingly, as shown in FIG. 1, the water rises in the exhaust pipe 7 until reaching a maximum water level wl in the tank S, and thus the water pressure is relieved with the air cushion $6a$. The sound waves transmitted in the water are also relieved and eliminated in the cylinder 1.

The diameter of the exhaust pipe 7 is determined in accordance with the inner diameter of the member 6, however it should be at least such as not to cause any deterioration of the cushioning effect.

At the lower part of the front wall 3, a fitting 9 is welded for an outlet pipe 8, leading to the heating system and the like.

Now the operation of the invention is to be described. The parts of the invention device, as actually used for embodying the invention, are specified as follows:

| | |
|---|---|
| Diameter of the inlet fitting 4 | 25 mm |
| Diameter of the cylinder 1 | 100 " |
| Length of the cylinder 1 | 420 " |
| Height of the air-cushion member 6 | 100 " |
| Diameter of the air cushion member 6 | 97 " |
| Diameter of the exhaust pipe 7 | 22 " |

In addition, the water volume flowing into the device is considered, as running in the cylinder 1 with a flow speed of 21.2 cm./sec. It is obvious that when the hot water W is forced to flow through the pump P, the water flows into the cylinder to separate the air bubbles and reaches the air cushion 6a, where it rises in the exhaust pipe 7 and is exhausted to the outside, e.g. into the tank S.

Further, the following was ascertained. The sound wave entering the cyliner 1 runs against the front wall 3, which results in a reaction. This causes collisions with another sound wave which runs directly from the inlet pipe 5, and converted to heat by mutual interference therebetween, while the heat is exhausted through the pipe 7.

It has been found that a metallic sound produced by the vibration of the pressure inside a pipe is absorbed by the air cushion 6a and disappears. Further it is noted that when the water flow speed is increased to 80 cm/sec, in the cylinder 1, the air-bubble separating effect is slightly decreased.

Figure 4:
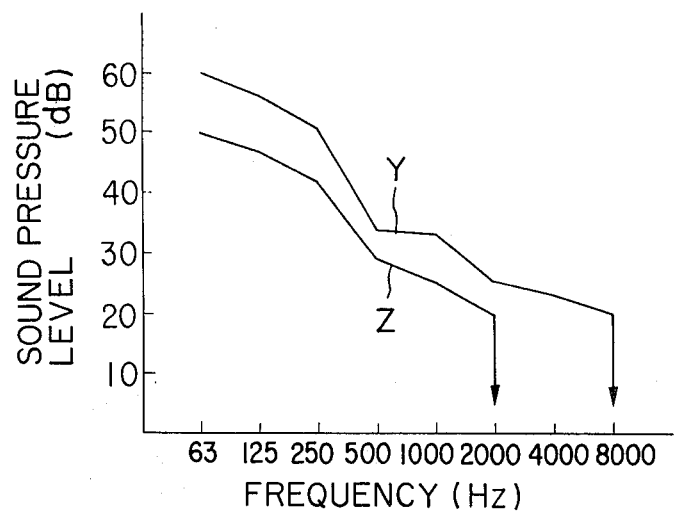
FIG. 4 is a graph showing the obtained silencing effect.

Now the silencing effect is described with reference to FIG. 4. The ordinate represents the sound-pressure level in decibels, while the abscissa shows the frequency in Hz. The line Y indicates the effect without the device according to the invention, while the line Z indicates the silencing effect with the use of the device. As will be obvious from FIG. 4, according to the line Z, the sound pressure level is lowered to 20 dB or less at a frequency of 2000 Hz; however according to the line Y, it reaches the 20 dB value only at the higher frequency of 8000 Hz, which is more noticeable and disturbing.

As described hereinbefore, the present invention provides a considerable effect in its application not only to a hot-water heating system but also to a cold-water cooling system and to similar other applications.

It is obvious that various changes and modifications in the design of the invention can be made which are within the scope of the techniques of the invention as long as the above-described objects and effects are obtained.

What I claim is:

1. A device for separating air bubbles from a fluid flow and for silencing sound carried from the fluid flow into a pipe system which includes a pump-side and a consumer-side pipe and respective fittings thereat, the device comprising a hollow cylinder which is large in comparison with the cross-sectional measurements of said pipes in the system, said cylinder having respective inlet and outlet ends as well as end walls in parallel alignment with each other at said ends, said pump-side pipe being connected to an upper region of one end wall, and said consumer-side pipe being connected to a lower region of another end wall, a cylinrical air-cushion member protruding on the top of said cylinder at a position nearer to said outlet end than to said inlet end, the height of said member being greater than the diameter of said cylinder, and an exhaust pipe protruding from above into said member by about ½ to 4/5 of said height of the member, said exhaust pipe being surrounded by an air cushion formed in said member, and wherein said cylinder has welded portions at said ends, which are made substantially perpendicular to the respective end walls.

2. The device as defined in claim 1, wherein the diameter of said air-cushion member is substantially the same as that of said cylinder.

3. The device as defined in claim 1, wherein said cylinder is approximately 4 to 9 times longer than its diameter.

4. The device as defined in claim 1, wherein said air-cushion member is so positioned that the axis thereof is at a position within 1/10 to 4/10 of the length of said cylinder from the outlet end thereof.

5. The device as defined in claim 1, wherein said cylinder has front and rear walls that are provided with respective fitting pipes for inlet and outlet.

6. The device as defined in claim 5, wherein the diameter of said cylinder is 2 to 5.5 times larger than that of at least said inlet fitting pipe.

* * * * *